United States Patent [19]

Tukao et al.

[11] 4,404,007
[45] Sep. 13, 1983

[54] EXHAUST GAS CLEANING ELEMENT

[75] Inventors: Toshiyuki Tukao, Okazaki; Masahiro Tomita, Anjo, both of Japan

[73] Assignee: Nippon Soken, Inc., Nishio, Japan

[21] Appl. No.: 328,797

[22] Filed: Dec. 8, 1981

[30] Foreign Application Priority Data

Dec. 11, 1980 [JP] Japan ............................. 55-175464
Dec. 11, 1980 [JP] Japan ............................. 55-175465
Mar. 30, 1981 [JP] Japan ............................. 56-46756
Apr. 20, 1981 [JP] Japan ............................. 56-60481
Jul. 16, 1981 [JP] Japan ............................. 56-111633

[51] Int. Cl.$^3$ ...................... B01D 39/20; C04B 21/06
[52] U.S. Cl. .......................................... 55/523; 55/524;
55/DIG. 30; 210/509; 210/510; 422/180
[58] Field of Search ................ 55/523, 524, DIG. 30;
210/510, 505, 508, 509; 422/180, 222; 428/116,
117; 252/477 R; 60/311

[56] References Cited

U.S. PATENT DOCUMENTS 4,251,239  2/1981  Clyde et al. ..................... 210/510
4,264,346  4/1981  Mann ................................. 55/523

Primary Examiner—David L. Lacey
Attorney, Agent, or Firm—Cushman, Darby & Cushman

[57] ABSTRACT

An improved exhaust gas cleaning element comprising a ceramic honeycomb structure body having inner wall surfaces defining plural cells, each cell defining a passageway through which exhaust gas flows, characterized in that a multiplicity of arranged projections are provided over the entire wall surfaces of the cells in the structure body, the projections extending into the exhaust gas passageway, and the wall surfaces having a multiplicity of through-holes communicating with the adjoining cell.

4 Claims, 8 Drawing Figures

EXHAUST GAS CLEANING ELEMENT

BACKGROUND OF THE INVENTION

This invention relates to an exhaust gas cleaning element especially designed for cleaning the exhaust gas emitted from the internal combustion engines of automobiles, etc., and a method of producing such an element.

There are known in the art the following methods for producing this type of exhaust gas cleaning element: (1) a method in which a flat sheet mainly composed of a ceramic material and a corrugated sheet obtained by corrugating said flat sheet are wrapped alternately around a center shaft to form an integral structure, and this structure is fired and solidified to obtain a desired exhaust gas cleaning element, and (2) a method in which a plastic batch material mainly composed of ceramic is fed under pressure into a molding die and extrusion molded to form a molding having a honeycomb structure, and this molding is fired and solidified as in the case of method (1) to obtain an exhaust gas cleaning element. The elements obtained according to these methods, however, involve the following problem: when such an element is set in the exhaust gas passage for effecting cleaning of the exhaust gas, although the exhaust gas flow resistance is low, the interaction between the exhaust gas and the wall surfaces of the element is also lowered because the direction of the exhaust gas flow is the same as the direction of the cells formed in the element, so that the material mobility between the flowing exhaust gas and the element wall surfaces is restricted to give rise to a so-called blow-by phenomenon of the exhaust gas, resulting in a poor exhaust gas cleaning efficiency and a low capturing rate of the fine particles (such as carbon particles) contained in the exhaust gas.

A method has been also proposed in which a specific configuration is made on the mold used for the extrusion molding of said honeycomb structure to form the projections or ruggedness on the inner wall surfaces of the produced honeycomb structure. However, this method, too, is unable to improve the interaction between exhaust gas and wall surfaces of the structure because the direction that the projections rise from the surface is inevitably the same as the exhaust gas flow direction owing to the use of extrusion molding for forming the honeycomb structure. This method also had the problem of low capturing rate of the fine particles existing in the exhaust gas and hence an unsatisfactory exhaust gas cleaning efficiency.

An exhaust gas cleaning element composed of a ceramic porous material having a plurality of voids opening to the outside for allowing passage of exhaust gas therethrough has been also proposed. This element using such ceramic porous material, however, is still unsatisfactory in capturing the fine particles such as carbon particles contained in exhaust gas.

An object of the present invention is to provide an improved exhaust gas cleaning element in which a plurality of projections are provided on the inner wall surfaces in said ceramic honeycomb structure or on the skeleton of a ceramic porous mass so as to disturb the exhaust gas flow by said projections to activate the interaction between the exhaust gas and the inner wall surfaces in said structure or skeleton of said ceramic mass and thereby enhance the exhaust gas cleaning action of the element.

Another object of the present invention is to provide an exhaust gas cleaning element having an improved exhaust gas cleaning performance, said element being characterized in that a plurality of through-holes are formed in the inner walls of a plurality of cells in a ceramic honeycomb structure.

A further object of this invention is to provide a method of producing such an exhaust gas cleaning element.

The present invention is now described in detail concerning the embodiments illustrated in the accompanying drawings, but it is to be understood that the present invention is not limited to these embodiments.

DETAILED DESCRIPTION OF THE DRAWINGS

Figure 1:
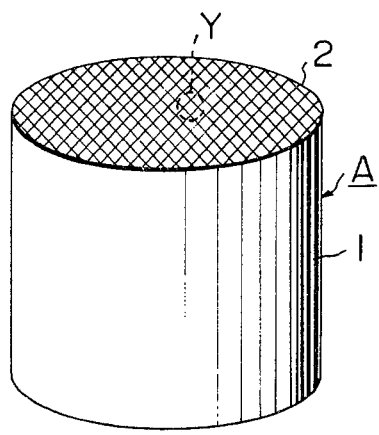
FIG. 1 is a general view of a ceramic honeycomb structure element A according to this invention, wherein 1 indicates a ceramic honeycomb structure body, 2 indicates a plurality of cells in said honeycomb structure body, and Y indicates a part of said cells.
Figure 2:
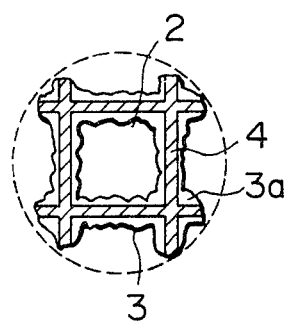
FIG. 2 is an enlarged view of the encircled part in FIG. 1, indicated by Y, showing a first embodiment wherein 2 indicates a cell, 3 indicates a ceramic layer, 3a indicates a projection or raised portion, and 4 indicates an inner wall of the honeycomb structure body.
Figure 3:
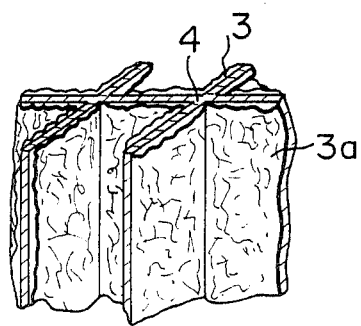
FIG. 3 is a perspective view of the honeycomb structure body shown in FIG. 2.
Figure 4:
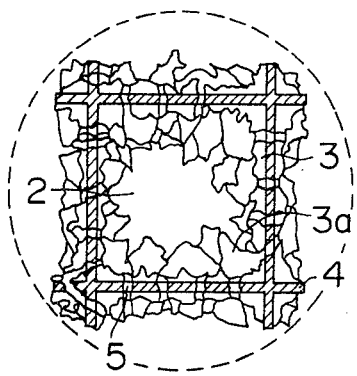
FIG. 4 is an enlarged view of the encircled part in FIG. 1 showing a second embodiment, wherein 5 indicates a plurality of through-holes formed in the inner walls of said honeycomb structure body.
Figure 5:
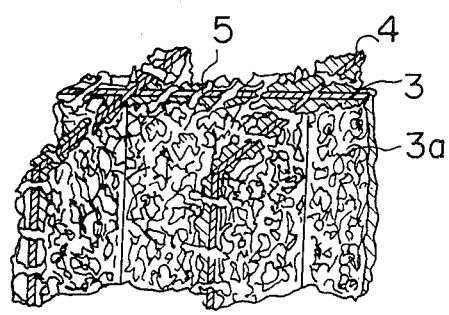
FIG. 5 is a perspective view of the honeycomb structure body shown in FIG. 4.
Figure 6:
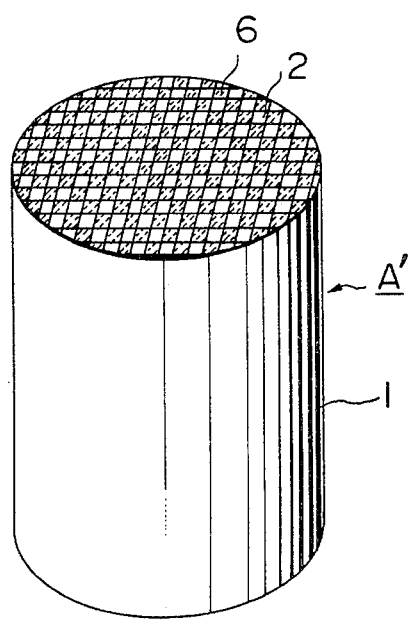
FIG. 6 is a general view of a ceramic honeycomb structure element A' according to this invention, wherein 1 indicates the honeycomb structure body, 2 indicates a plurality of cells in said honeycomb structure, and 6 indicates the ceramic covers closing the end faces of every other cells 2.
Figure 7:
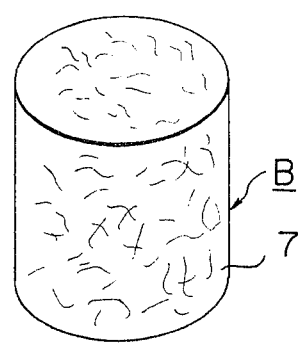
FIG. 7 is a perspective illustration of a ceramic porous structure element B according to this invention, wherein 7 indicates a ceramic porous structure body.
Figure 8:
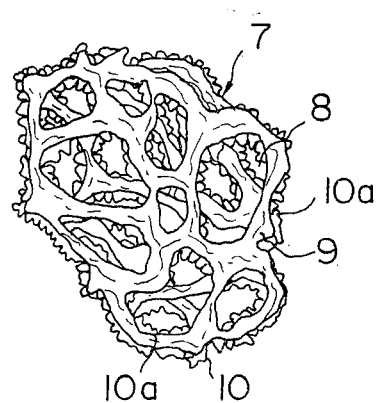
FIG. 8 is an enlarged view of the ceramic porous structure body 7 shown in FIG. 7, wherein 8 indicates a void, 9 indicates the skeleton of the structure, 10 indicates a ceramic layer, and 10a indicates a projection or raised portion.

Referring to FIG. 1, there is shown a general view of an element, designated A, according to this invention, said element being made of a composition comprising a ceramic material such as cordierite as the principal ingredient. In the drawing, 1 indicates a honeycomb structure body having a cylindrical or other suitable configuration measuring, for example, 100 mm in outer diameter and 120 mm in height, said structure having a plurality of cells 2 numbering 400–200 cells/in$^2$ on the average. On the inner wall 4 of each said cell 2 is provided a ceramic layer 3 having a rugged surface with a plurality of irregularly arranged projections 3a as illustrated in detail in FIGS. 2 and 3. As shown in FIGS. 4 and 5, a plurality of through-holes 5 are formed in the walls 4 defining the cells 2 to allow free passage of the gas between the adjoining cells 2. In FIG. 6, the end faces of alternating cells 2 of the honeycomb structure body 1 are clogged or plugged with the ceramic covers 6, so that the other side of the end faces of alternating cells 2 are open, whereby an exhaust gas directed into one side of the end faces is allowed to pass freely between the adjoining cells 2 through the through-holes 5 formed in the wall 4 as shown in FIGS. 4 and 5. According to such structure, the carbon particle capturing efficiency can be increased about 10% due to turbulent flow of the exhaust gas.

For producing a honeycomb structure body according to this invention, first a ceramic material capable of forming a heat-resist ceramic on sintering, such as cordierite, is mixed and kneaded with a suitable binder such as methyl cellulose and a proper quantity of water, and this mixture is molded into a green-body honeycomb structure by a suitable means such as extrusion molding, and then this green-body honeycomb structure is dried at a temperature below 100° C. The cells in said honeycomb structure body are filled with a flammable organic material such as carbon pellets, then a separately prepared slurry composed of a ceramic material such as cordierite, alumina, etc., a binder and water is poured into the spaces formed between said filler and cells, and after removing the excess slurry, the body is dried and fired. This processes forms the desired ruggedness or projections on the inner wall surfaces of the cells in the honeycomb structure body.

As said ceramic material, there may be used, in addition to cordierite, a material such as mullite, spondumene, zirconia, titania, alumina, magnesia or the like, but cordierite is most preferred because of its low coefficient of thermal expansion in comparison with those of other materials.

The binder used for said purpose in this invention may not necessarily be methyl cellulose; it is also possible to use other suitable materials such as polyvinyl alcohol.

The ruggedness or projections on the inner wall surfaces of the cells in the ceramic honeycomb structure body of this invention may be formed by various methods. According to a preferred method, for example, the coarse particles of cordierite ceramic are dispersed in said slurry, then the green-body honeycomb structure is immersed in said dispersion under stirring and then dried at a temperature below 100° C., and after repeating said immersion and drying 1 to 3 times, the structure is fired at a temperature of from 800° to 1,400° C.

In another preferred method for forming said ruggedness on the inner wall surfaces of the cells in the ceramic honeycomb structure body of this invention, a metal powder capable of generating hydrogen gas upon reaction with an acid, such as aluminum powder, magnesium powder, iron powder, nickel powder or sodium hydrogen-carbonate (in this case, carbon dioxide gas is generated to effect foaming) is mixed in said slurry, then said green-body honeycomb structure is immersed in this slurry, and when the body is half-dried, said body is further immersed in an aqueous solution of a dilute acid, such as hydrochloric acid, sulfuric acid, nitric acid or phosphoric acid, and foamed by the action of the generated hydrogen gas to form a plurality of said projections or ruggedness on the inner wall surfaces of the cells, and then the body is dried and fired.

According to yet another method for forming said ruggedness on the cell wall surfaces, said green-body honeycomb structure is immersed in a slurry composed of cordierite, water and an isocyanate, then after removing the excess slurry, said honeycomb structure body is further immersed in a separately prepared slurry containing an amine and foamed at the wall surfaces of the cells to form the desired ruggedness. This body is then dried and fired to obtain structure element A.

It is also possible to obtain the objective element A by first mixing a metal powder such as aluminum powder in the base material of the honeycomb structure, molding the mixture to form a green-body honeycomb structure, drying same, then immersing it in a slurry containing a separately prepared ceramic material (such as fine powder of cordierite), a binder, water and mineral acid (such as hydrochloric acid) to generate hydrogen by the reaction between the metal powder and the acid mixed in the honeycomb structure body, foaming the structure body by the action of the generated hydrogen gas to form a number or irregular projections on the inner wall surfaces of the cells, and then drying and firing the thus worked honeycomb structure body.

In still another method for forming the ruggedness on the inner wall surfaces of the cells in the honeycomb structure body, a green-body honeycomb structure is immersed in an organic solvent solution of a film-forming polymer and then dried to form a coating film of said film-forming polymer on the inner wall surfaces of the cells in the honeycomb structure body, and then this body is quickly dried by a high-frequency drying machine to cause rapid boiling of water remaining in the body to thereby form a plurality of jags on the inner walls of the cells. In this case, polyvinyl butyral or other like polymers may be used as said film-forming polymer, while an organic solvent such as ethanol may be used as the solvent in said process.

It is also embraced within the scope of this invention to produce an element having a plurality of through-holes in the walls defining the cells in the honeycomb structure body by mixing in said ceramic material a substance such as iron powder, nickel powder, copper powder, etc., which is capable of being melted with said material eutectically or in the form of a solid solution to form a liquid phase at a temperature lower than the melting point of said ceramic material, then molding this mixture into a green-body honeycomb structure and firing this body at a temperature of from 1,300° to 1,470° C. In this case, it is possible to form the through-holes of any desired size in the cell walls by properly selecting the size of the metal powder used.

Any of the above-described methods for forming the ruggedness on the inner wall surfaces of the cells in the ceramic honeycomb structure body can be equally applied for forming the similar ruggedness on the skeleton of a ceramic porous mass.

The present invention is further described hereinbelow by way of the embodiments thereof, but it will be apparent that the invention is not restricted by these embodiments.

EXAMPLE 1

1,500 Grams of fine particles (less than 200 mesh) of cordierite and 100 g of methyl cellulose were mixed by adding 450 g of water, and the mixture was extrusion molded using a known die to obtain a green-body honeycomb structure 1 having the predetermined dimensions, and this green-body honeycomb structure was dried at 80° C. for 5 hours. Then the cells 2 in said honeycomb structure body 1 were filled with pellets (approx. 0.8 mm in diameter) of a flammable organic substance, such as a resin. Thereafter, a slurry prepared by mixing 1,500 g of cordierite powder and 50 g of methyl cellulose in 2,000 g of water was poured into the spaces formed between said cells 2 and the pellets, and the air in said cells 2 was purged out by using a vacuum pump or other means. Thereafter, the body was dried at 80° C. for 10 hours and then fired at 1,300°-1,470° C. for 5 hours, whereby the carbon or organic substance filling the cells 2 was burned out and consequently an element A provided with the ceramic layers 3 having projections or ruggedness 3a was obtained.

The thus obtained element A had a compression strength of 250-350 kg/cm² in the axial direction, 50-150 kg/cm² in the diametrical direction and 10-30 kg/cm² in the diagonal direction.

Then said element A was mounted in the exhaust pipe of a diesel engine and the efficiency of the unit in the capturing the fine carbon particles in exhaust gas was measured. The particle capturing rate was approximately 50% per hour on the average. This presents a vivid contrast to the carbon particle capturing rate of only 5-10% in the honeycomb structure element which is not provided with the ceramic layers 3 having ruggedness 3a.

Although the cells 2 in the honeycomb structure body 1 produced in this example is rectilinear, it is also preferable to arrange the cells in a twisted or screwed form as by wrenching the body 1.

EXAMPLE 2

A green-body honeycomb structure 1 was obtained in the same way as Example 1, and then a slurry prepared by mixing 1,500 g of cordierite powder, 50 g of methyl cellulose, 500 g of pellets of a flammable organic substance or carbon having a particle size of 300 microns and 3,000 g of water was poured into the cells 2 in said honeycomb structure body to form a coating film on the wall surfaces of said cells, and then this honeycomb structure was dried at 80° C. for 5 hours and further fired at 1,300°-1,470° C. for additional 5 hours to obtain an element A.

The thus obtained element was substantially equal to that of Example 1 in both strength and carbon capturing efficiency.

EXAMPLE 3

A fired honeycomb structure body 1 was obtained according to the method of Example 1. Then the cells 2 in said body were filled with pellets of the same material as used in Example 1, followed by pouring a slurry of the same composition as in Example 1 and then drying and firing of the body to obtain an element A similar to that of Example 1.

The thus obtained element A was completely resistant to separation of the inner walls 4 and the ceramic layers 3 having projections of ruggedness 3a.

According to this invention, said ruggedness 3a can be also formed by immersing a honeycomb structure body 1 in said ceramic material mixed with a foaming agent to thereby foam the inside of the cells 2.

EXAMPLE 4

1,500 Parts of fine particles (less than 200 mesh) of cordierite and 100 parts of methyl cellulose were mixed by adding 450 parts of water, and the mixture was extrusion molded by a known extruder die to obtain a green-body ceramic honeycomb structure of a predetermined size, and this honeycomb structure body was dried at 80° C. for 5 hours. Then a cordierite slurry was produced by mixing 1,500 parts of cordierite, 60 parts of polyvinyl alcohol and 2,500 parts of water under stirring and further dispersing therein 500 parts of coarse particles (100-800 μm) of cordierite ceramic. This slurry was poured into the cells in said honeycomb structure body so that said slurry deposited on the surfaces of the inner wall 4 of said cells 2. After removing the excess slurry by centrifugation or by compressed air, the body was dried at 80° C. for 2 hours. Said operations from immersion to drying are conducted one to three times. After completion of the above process, the slurry-impregnated honeycomb structure body was fired at 1,300°-1,470° C. for 5 hours to obtain an element A.

EXAMPLE 5

This Example concerns a method for providing the projections or ruggedness 3a on the inner wall 4 of the honeycomb structure body 1 by coating γ-alumina on the surfaces of said wall 4.

90 Parts of alumina sol, 120 parts of aluminum nitrate, 300 parts of colloidal silica, 960 parts of γ-alumina and 1,500 parts of water were mixed and stirred for 1-2 hours to form a γ-alumina slurry, and then the coarse particles (particle size being same as used in Example 4) of cordierite ceramic were added and dispersed in said γ-alumina slurry, followed by stirring. Thereafter, a honeycomb structure body produced and fired after the manner of Example 4 was immersed in said γ-alumina slurry while stirring said slurry. The excess slurry was removed in the same way as in Example 1 and then the structure was dried at 80° C. for 2 hours. After repeating said immersing and drying operations 1 to 3 times, the slurry-impregnated honeycomb structure was fired at 800° C. for one hour to obtain an element A.

EXAMPLE 6

1,500 Grams of finely powdered cordierite (particle size being less than the 200 mesh) and 90 g of methyl cellulose were mixed by adding 400 g of water, and the mixture was extrusion molded to obtain a honeycomb structure 1, and this structure was dried at 80° C. for 5 hours. This honeycomb structure 1 was then immersed in a slurry produced by mixing 1,500 g of finely powdered cordierite, 60 g of polyvinyl alcohol, 2,000 g of water and 30 g of aluminum powder (less than 350 mesh), and after removing the excess slurry by centrifugation or compressed air, the structure was half-dried at 80° C. for 1 hour. Then this honeycomb structure 1 was immersed in a 0.1 N hydrochloric acid solution, producing hydrogen gas from the reaction of aluminum powder and hydrochloric acid to thereby foam the structure, forming a plurality of projections or ruggedness 3a on the wall 4 of the cells 2 in the honeycomb structure body 1. The body was then dried at 80° C. for 5 hours and further fired at 1,300°-1,470° C. for 5 hours to obtain an element A.

Although a non-fired honeycomb structure was used in this Example, it is also possible to form the similar ruggedness 3a by using a fired honeycomb structure.

EXAMPLE 7

A honeycomb structure 1 was produced by using the same materials and the same method as in Example 6, and this honeycomb structure was immersed in a slurry composed of 1,500 g of finely powdered cordierite, 2,500 g of water and 250 g of tolylene diisocyanate. The excess slurry was removed by the same means as used in Example 6. Then said honeycomb structure body 1 was immersed in a slurry comprising 20 parts of polytetraethyleneglycol, 10 parts of triethanolamine, 6 parts of dimethylpolychlorosilane and 8 parts of fluorotrichloromethane and foamed at the wall surfaces of the wall 4 of the cells 2 to form a plurality of projections 3a on the surfaces of said wall 4. Then the structure was dried and fired after the manner of Example 6 to obtain an element A.

EXAMPLE 8

1,500 Grams of fine powder (less than 200 mesh) of cordierite, 90 g of methyl cellulose and 15 g of aluminum powder (less than 350 mesh) were mixed by adding 400 g of water, and the mixture was extrusion molded to obtain a honeycomb structure 1. This structure was dried at 80° C. for 5 hours and then immersed in a slurry composed of 1,500 g of finely powdered cordierite, 60 g of polyvinyl alcohol, 10 cc of concentrated hydrochloric acid and 2,000 g of water. The body was foamed as in Example 1 by the reaction of aluminum powder and hydrochloric acid to form a plurality of projections 3a on the wall 4 of the cells 2. Then the body was dried and fired according to the method of Example 1 to obtain an element A.

No foaming agent is contained in the immersion slurry used in the instant Example, but it is possible to use the slurry of Example 6.

EXAMPLE 9

A honeycomb structure body 1 was obtained by using the same materials and same method as in Example 6, and this structure was half-dried at 80° C. for 30 minutes. Then said honeycomb structure body 1 was immersed in a solution prepared from 100 g of polyvinyl butyral and 1,000 g of ethyl alcohol and thereafter air-dried to form a polyvinyl butyral coating on the wall 4 of the cells in the structure 1. This honeycomb structure body 1 was then quickly dried by a 2,500 MHz high-frequency drying machine. A multiplicity of projections 3a were formed on the wall 4 of the cells 2 by rapid boiling of the water remaining in the body 1. The body was then dried and fired after the manner of Example 6 to obtain an element A. If a cordierite slurry containing polyvinyl butyral as binder is used instead of said polyvinyl butyral coating in this Example, the number of the projections 3a produced is markedly increased.

EXAMPLE 10

1,500 Grams of finely pulverized cordierite (less than 200 mesh), 45 g of iron powder (100–700 mesh) and 90 g of methyl cellulose were mixed by adding 400 ml of water, and the mixture was extrusion molded by a known die to obtain a green-body honeycomb structure body 1, and this body was dried at 80° C. for 5 hours. Then said honeycomb structure body 1 was immersed in a ceramic slurry prepared from 1,500 g of pulverized cordierite, 100 g of polyvinyl alcohol, 1,000 g of coarse particles (500–1,000 microns) of cordierite and 2,500 ml of water, and the excess slurry was removed by means of compressed air or centrifugation. Thereafter, the body was dried at 80° C. for 5 hours and further fired at 1,300°–1,470° C. for additional 5 hours, obtaining an element A having a great many of through-holes 5 in both ceramic layers 3 formed with a number of projections 3a and walls 4.

Thus having a construction with a plurality of projections 3a being provided on a honeycomb structure body 1 produced by extrusion molding, the element A of this Example has a very high dimensional precision which is substantially equal to that of a monolithic structure. Also, according to this structure provided with a large number of projections 3a and a great many of through-holes 5, the exhaust gas flow is considerably disturbed as the gas flowing in a cell 2 repeatedly impings against the projections 3a and/or flows out from the through-holes 5, resulting in an activated interaction between the exhaust gas and an element A to greatly enhance the element's carbon particle capturing efficiency.

When this element A was mounted in the exhaust pipe of a Diesel engine and its carbon particle capturing efficiency was measured, the result showed approximately 60% capture of carbon particles per hour on the average. It has been also ascertained that the carbon particle capturing rate increases by 5–20% if $\gamma$-$Al_2O_3$ is coated on this element A.

As for the means for depositing coarse particles of ceramic, there may be employed another method than the one used in this Example. For example, the wall surfaces of the honeycomb structure 1 may be coated with a ceramic slurry before effecting deposition of said coarse ceramic particles.

EXAMPLE 11

A green-body honeycomb structure 1 incorporated with iron powder was obtained according to the method of Example 10, and this body was immersed in a slurry composed of 1,500 g of finely powdered cordierite, 60 g of polyvinyl alcohol, 2,000 ml of water and 40 g of finely powdered aluminum (less than 350 mesh). After removing the excess slurry in the same way as in Example 1, said body was half-dried at 80° C. for one hour and then again immersed in a 0.1 N hydrochloric acid solution, whereupon aluminum powder and hydrochloric acid were reacted to produce hydrogen, which caused foaming of the slurry coating. Then the body was dried a 80° C. for 5 hours and fired at 1,300°–1,470° C. for additional 5 hours to obtain an element A similar to that of Example 10.

Now, the method of producing another structure element B of this invention is described by way of the following examples,

EXAMPLE 12

A columnar organic foam (such as polyurethane foam) of a three-dimensional reticulate structure having the inside communicating voids opening to the outside was immersed in a slurry formed by mixing 1,500 g of finely pulverized cordierite, 120 g of methyl cellulose and 2,200 g of water. After removing the excess slurry by a centrifugation of by compressed air, said foam was dried at 80° C. for 3 hours. Said immersing and drying steps were repeated several times to effect slurry deposition of a predetermined amount. Then said foam was immersed in a slurry composed of 1,500 g of finely pulverized cordierite, 2,500 g of water and 250 g of toluene diisocyanate (TDI) 80/20, and the excess slurry was removed by the same means as above. The foam was again immersed in a slurry composed of 20 parts of polytetraethyleneglycol, 10 parts of triethanolamine, 6 parts of dimethylpolychlorosilane and 8 parts of fluorotrichloromethane to effect foaming at the surfaces of the foam skeleton, and the thus treated foam was dried at 80° C. for 3 hours and then fired at 1,300°–1,470° C. for 5 hours to obtain an element B.

This element B was mounted in the exhaust pipe of a Diesel engine to measure its carbon particle capturing efficiency, the resulting showing 75% capture of carbon particles per hour on the average. The striking excellency of this result will be evident when it is contrasted to 35% capture of carbon particles in the case of a ceramic porous element having no ceramic layers 10 with ruggedness 10a.

EXAMPLE 13

A fired ceramic porous mass 7 was obtained according to the method of Example 12, and this porous mass was immersed in a slurry composed of 1,500 g of finely pulverized cordierite, 50 g of methyl cellulose, 500 g of pellets of a flammable organic material or carbon having an average particle size of 300 microns and 3,000 g of water. Then the immersed ceramic porous mass 7 was dried at 80° C. for 5 hours and further fired at 1,300°–1,470° C. for 5 hours to obtain an element B.

The thus obtained element B showed substantially the same strength and same carbon capturing rate as the product of Example 12.

Althrough the ceramic porous mass is made of cordierite in this Example, it is of course possible to use mullite, alumina or the like. Also, the shape of the mass may not necessarily be columnar; it may be rectangular.

In either case, the product of this invention can capture the fine particles in exhaust gas at a higher rate than the conventional structural element.

EXAMPLE 14

A columnar organic foam (such as polyurethane foam) of a three-dimensional reticulate structure having the inside communicating voids opening to the outside was immersed in a slurry composed of 1,500 parts of finely powdered cordierite, 120 parts of methyl cellulose and 2,200 parts of water, and after removing the excess slurry by means of centrifugation or compressed air, said foam was dried at 80° C. for 3 hours. Said immersion and drying steps were repeated several times to deposit a predetermined amount of slurry on said columnar organic foam, and then said foam was fired at 1,300°–1,470° C. for 5 hours to obtain a ceramic porous mass 7.

Then, a cordierite slurry was prepared by mixing 1,500 parts of cordierite, 60 parts of polyvinyl alcohol and 2,500 parts of water and then further adding and dispersing therein 500 parts of cordierite ceramic of coarse particles (100–800 μm), and the previously obtained ceramic porous mass 7 was immersed in said slurry under stirring to deposit the coarse ceramic particles on the surfaces of the skeleton 9 of said ceramic porous mass 7. Excess slurry was removed by using centrifugation or compressed air, and then the mass was dried at 80° C. for 2 hours. The process from said immersion to drying was repeated 1 to 3 times, and after the completion of this process, the impregnated ceramic porous mass was fired at 1,300°–1,470° C. for 5 hours to obtain an element B.

EXAMPLE 15

This Example relates to a method of forming projections 10a on the skeleton 9 of the ceramic porous mass 7 by coating γ-alumina on the surfaces of said skeleton 9.

First, a γ-alumina slurry was produced by mixing 90 parts of alumina sol, 120 parts of aluminum nitrate, 300 parts of colloidal silica, 960 parts of γ-alumina and 1,500 parts of water and stirring the mixture for 1-2 hours. Cordierite ceramic in the form of coarse particles (the particle size being same as in Example 14) was added and dispersed in said γ-alumina slurry, followed by stirring. Then a ceramic porous mass 7 produced and fired in the same way as in Example 14 was immersed in said γ-alumina slurry. Excess slurry was removed by the same means as used in Example 14, and then this γ-alumina slurry-impregnated ceramic porous mass was dried at 80° C. for 2 hours. After repeating said immersion and drying 1 to 3 times, the mass was fired at 800° C. for one hour to obtain an element B.

EXAMPLE 16

A cordierite slurry was prepared by mixing 1,500 parts of finely pulverized cordierite (the particle size being same as in the case of Example 14), 60-100 parts of polyvinyl alcohol and 1,500–3,000 parts of water and stirring the mixture for 1-2 hours. Then a ceramic porous mass 7 produced according to the method of Example 14 was immersed in said slurry. Excess slurry was removed by using compressed air, and then the voids 8 in said porous mass 7 were filled with the coarse particles of cordierite ceramic (the particles size being same as in the case of Example 14) to deposit said particles on said slurry. Those of the coarse cordierite ceramic particles which did not deposit were removed by means of shaking or compressed air, and then said porous mass 7 was dried at 80° C. for 2 hours and further fired under the same conditions as in Example 14 to obtain an element B.

EXAMPLE 17

A columnar polyurethane foam of a three-dimensional reticulate structure having the internal communicating voids opening to the outside was immersed in a slurry formed by mixing 1,500 g of finely pulverized cordierite (less than 200 mesh) and 90 g of methyl cellulose with 2,500 g of water. Excess slurry was removed by centrifugation or by using compressed air, and said foam was dried at 80° C. for 3 hours. Said immersion and drying operations were repeated several times to deposit a predetermined amount of slurry. This slurry-impregnated columnar polyurethane foam was then fired at 1,300°–1,470° C. for 5 hours to obtain a ceramic porous mass 7. This porous mass was then immersed in a slurry composed of 1,500 g of finely powdered cordierite, 60 g of polyvinyl alcohol, 2,000 g of water and 30 g of aluminum powder (less than 350 mesh), and after removing excess slurry of centrifugation or compressed air, said mass was half-dried at 80° C. for one hour. Then said porous mass 5 was again immersed in a 0.1 N hydrochloric acid solution, whereupon aluminum powder and hydrochloric acid were reacted to produce hydrogen gas which caused foaming of the mass to form a large number of projections 10a on the skeleton 9 of said porous mass 7. Said mass was then dried at 80° C. for 5 hours and further fired at 1,300°–1,470° C. for 5 hours to obtain an element B.

In this Example, the fired polyurethane foam was impregnated with said foaming agent-containing slurry, but the polyurethane foam, not fired, may be impregnated with said slurry in a dry state and then fired. This can apply to the following Examples, too.

EXAMPLE 18

A porous mass 7 was produced with the same materials and in the same way as in Example 17, and this porous mass was immersed in a slurry composed of 1,500 g of pulverized cordierite, 2,500 g of water and 250 g of tolylene diisocyanate. Excess slurry was removed by the same means as used in Example 17. Then said porous mass 7 was again immersed in a slurry composed of 20 parts of polytetraethyleneglycol, 10 parts of triethanolamine, 6 parts of dimethylpolychlorosilane and 11 parts of fluorotrichlorosilane, whereby the mass was foamed at the wall surfaces of the skeleton to form a plurality of projections or ruggedness 10a on said wall surfaces. This mass was then dried and fired in the same way as in Example 5 to obtain an element B.

EXAMPLE 19

A porous mass 7 was obtained according to the method of Example 17 by using a mixture consisting of 1,500 g of finely powdered cordierite (less than 200 mesh in particle size), 90 g of methyl cellulose, 15 g of aluminum powder (less than 350 mesh) and 2,500 g of water. This porous mass 7 was then immersed in a slurry composed of 1,500 g of pulverized cordierite, 60 g of polyvinyl alcohol, 10 ml of concentrated hydrochloric acid and 2,000 g of water. Consequently, foaming occured in a similar way to Example 17 owing to the reaction between the aluminum powder and hydrochloric acid, forming a plurality of projections 10a on the skeleton. This mass was then dried and fired in the manner of Example 17 to obtain an element B.

No foaming agent is contained in the slurry used in this Example, but it is possible to use the slurry of Example 17.

EXAMPLE 20

By using the same method and materials as in Example 17, a polyurethane foam was impregnated with a cordierite slurry and then half-dried at 80° C. for 30 minutes. This porous mass 5 was then immersed in a solution comprising 100 g of polyvinyl butyral and 1,000 g of ethyl alcohol and then air dried to form a polyvinyl butyral coating on the skeleton 9 of said porous mass 7. This mass 7 was then rapidly dried by, for example, a 2,500 MHz high-frequency drier. Since water remaining in the slurry adhering to the polyurethane foam skeleton was quickly boiled by this operation, a large number of projections were produced on the surface of the slurry coating on the foam skeleton. The thus worked mass was then dried and fired after the manner of Example 5 to obtain an element B.

In this case, the number of the projections 10a formed is greatly increased when a cordierite slurry containing polyvinyl butyral as binder is used instead of polyvinyl butyral coating.

What is claimed is:

1. A rigid ceramic element adapted for capturing and retaining carbon from the exhaust gas of a diesel engine, said element comprising a ceramic monolithic honeycomb structure having inner wall surfaces defining a plurality of cells extending throughout the length of said element, each cell having an open inlet end and an open outlet end defining therebetween a passageway through which said exhaust gas flows, and an irregular reticulate ceramic layer coated upon said inner wall surfaces defining each of said cells, said ceramic layer including a multiplicity of irregularly arranged projections extending into said exhaust gas passageway so as to disturb the exhaust gas flow therethrough to activate the interaction between the exhaust gas and said inner wall surfaces to enhance the capturing and retaining of carbon from the exhaust gas.

2. A rigid ceramic element adapted for capturing and retaining carbon from the exhaust gas of a diesel engine, said element comprising a ceramic monolithic honeycomb structure having inner wall surfaces defining a plurality of cells extending throughout the length of said element, each cell having an open inlet end and an open outlet end defining therebetween a passageway through which said exhaust gas flows, said inner wall surfaces further including a multiplicity of throughholes communicating said passageways of adjoining cells, each cell having an irregular, reticulate ceramic layer coated upon said inner wall surface, the ceramic layer including a multiplicity of irregularly arranged projections extending into said exhaust gas passageway so as to disturb the exhaust gas flow therethrough to activate the interaction between the exhaust gas and said inner wall surfaces to enhance the capturing and retaining of carbon from the exhaust gas.

3. The ceramic element of claim 1 or 2 wherein alternating ones of said cell open inlet ends and open outlet ends include closure means for closing said alternating ones and for directing the exhaust gas to pass from one cell to an adjacent cell or cells as said exhaust gas flows through the ceramic element.

4. A rigid ceramic element adapted for capturing and retaining carbon from the exhaust gas of a diesel engine, said element comprising a porous ceramic mass having a skeleton structure defining a randomly arranged plurality of tortuous communicating spaces opening to the outside for allowing flow of said exhaust gas therethrough, and an irregular, reticulate ceramic layer coated on said skeleton structure and including a multiplicity of irregularly arranged projections extending into said spaces so as to disturb the exhaust gas flow therethrough to activate the interaction between the exhaust gas and said skeleton structure to enhance the capturing and retaining of carbon from the exhaust gas.

* * * * *